(12) United States Patent
Lunsford et al.

(10) Patent No.: US 7,512,685 B2
(45) Date of Patent: Mar. 31, 2009

(54) METHOD AND SYSTEM FOR IMPLEMENTING WIRELESS DATA TRANSFERS BETWEEN A SELECTED GROUP OF MOBILE COMPUTING DEVICES

(75) Inventors: E. Michael Lunsford, San Carlos, CA (US); Steve Parker, Centerville, UT (US); David Kammer, Seattle, WA (US); David Moore, Riverton, UT (US)

(73) Assignee: 3Com Corporation, Marlborough, MA (US)

( * ) Notice: Subject to any disclaimer, the term of this patent is extended or adjusted under 35 U.S.C. 154(b) by 800 days.

(21) Appl. No.: 09/727,982

(22) Filed: Nov. 30, 2000

(65) Prior Publication Data

US 2002/0065868 A1    May 30, 2002

(51) Int. Cl.
*G06F 15/16* (2006.01)
*H04B 7/00* (2006.01)

(52) U.S. Cl. .................. 709/227; 709/204; 709/217; 455/41.2

(58) Field of Classification Search ............ 709/200, 709/201–207, 213–217, 218, 219, 222, 227, 709/228; 455/41.2–41.3
See application file for complete search history.

(56) References Cited

U.S. PATENT DOCUMENTS

| | | | | |
|---|---|---|---|---|
| 6,128,661 A * | 10/2000 | Flanagin et al. | ............ | 709/227 |
| 6,359,711 B1 * | 3/2002 | Cole et al. | .................. | 398/58 |
| 6,421,716 B1 * | 7/2002 | Eldridge et al. | ............ | 709/219 |
| 6,529,119 B1 * | 3/2003 | Kumar et al. | .............. | 340/10.2 |
| 6,553,236 B1 * | 4/2003 | Dunko et al. | ................ | 455/457 |
| 7,072,939 B1 * | 7/2006 | Amro et al. | ................. | 709/204 |

OTHER PUBLICATIONS

Haartsen et al. "Bluetooth—The universal radio interface for ad hoc, wireless connectivity" Erricsson Review No. 3, 1998.*
Arfwedson et al. 'Ericsson's Bluetooth modules', Ericsson Review No. 4, 1999, pp. 198-205.*
Myers et al. 'Collaboration using multiple PDAs connected to a PC' Proceedings ACM 98 Conference on Computer Supported Cooperative Work, New York.*
Monson, Heidi 'Bluetooth technology and implications' from sysopt.com, Dec. 14, 1999.*
Bennett et al. "Piconet: Embedded Mobile Network" IEEE Personal Communications, Oct. 1997, pp. 8-15.*

* cited by examiner

*Primary Examiner*—Saleh Najjar
*Assistant Examiner*—David Lazaro (57) ABSTRACT

A wireless communication method for selective transmission of data among a group of mobile computing devices. A user's device is used to broadcast a query to determine a group of mobile computing devices within communications range. A list of resulting mobile computing devices is then presented to the user through the device's interface. The user selects at least one of the mobile computing devices from the list for a data transfer. The data transfer is then performed to the selected at least one mobile computing device. Upon completion of the transfer, a confirmation is presented to the user. In this manner, wireless data transfers can be performed with a number of different mobile computing devices within communications range. The user can select a number of mobile computing devices from the list and perform the data transfer to each of the selected number in a single step. The data transfer is performed using a wireless RF communications link. The wireless RF communications link can be compatible with a version of the Bluetooth specification.

14 Claims, 9 Drawing Sheets

METHOD AND SYSTEM FOR IMPLEMENTING WIRELESS DATA TRANSFERS BETWEEN A SELECTED GROUP OF MOBILE COMPUTING DEVICES

TECHNICAL FIELD

The present invention relates to a system and method by which a personal information device ("PID") may more easily send and receive data. In particular, the present invention relates to a system and method for linking a PID to a plurality of other mobile computing devices to allow the selective communication and sharing of data.

BACKGROUND ART

Personal Information Devices include the class of computers, personal digital assistants and electronic organizers that tend both to be physically smaller than conventional computers and to have more limited hardware and data processing capabilities. PIDs include, for example, products sold by Palm, Inc. of Santa Clara, Calif., under such trademark as Pilot, and Pilot 1000, Pilot 5000, PalmPilot, PalmPilot Personal, PalmPilot Professional, Palm, and Palm III, Palm V, Palm VII, as well as other products sold under such trade names as WorkPad, Franklin Quest, and Franklin Convey.

PIDs are generally discussed, for example, in U.S. Pat. Nos. 5,125,0398; 5,727,202; 5,832,489; 5,884,323; 5,889, 888; 5,900,875; 6,000,000; 6,006,274; and 6,034,686, which are incorporated herein by reference. PIDs typically include a screen and data processor, allowing the PID user to operate a substantial variety of applications relating to, for example: electronic mail, a calendar, appointments, contact data (such as address and telephone numbers), notebook records, a calendar, expense reports, :to do lists: or games. PIDs also often include substantial electronic memory for storing such applications as well as data entered by the user. Due to their substantial variety of applications and uses, personal information devices are becoming increasingly widely used.

One popular application of personal information devices is their ability to easily share information with other properly equipped personal information devices. For example, many types of user information such as electronic mail, calendar events, appointments, contact data, and the like exist in the form of digital data files stored within the memory of the personal information device. When equipped with communications hardware/software, the data files embodying the user information can be easily transferred from one personal information device to another. For example, one such application involves the transferring of electronic "business cards" from one personal information device to another, allowing their respective users to easily exchange contact information.

Infrared (IR) communications technology is one popular means for enabling the wireless transfer of digital data files between personal information devices. When properly configured, one device can transfer selected user information (e.g., electronic business cards) to another device quickly and wirelessly. For example, the user can access a menu of user information via a graphical user interface of the personal information device. The user selects one or more items for transfer and beams the data file to the other personal information device. The use of IR communications technology to effect such transfers is well known.

There is a problem however, in that to utilize IR communications technology, the personal information devices must be within line of sight of one another. For example, there must be an unobstructed view from the IR communications port of one device to the IR communications port of the other device. Additionally, the devices typically must be no more than two to three feet from one another. Care must be taken by the user to avoid sources of interference, such as, for example, bright sunlight.

Due to these limitations, IR communications technology and the techniques required for its effective use does not permit "group" beaming of data. The IR communications technology is directed towards one device directly beaming information to another device. The technology is not suited for beaming information to a group of devices.

The IR communications beaming techniques are not suited for privacy. For example, due to the range and line of sight restrictions, users must conspicuously ensure the IR ports of their respective devices are pointed at and aligned with one another. Others in the room are very likely to notice the pointing and aligning. Hence, an individual cannot IR beam data to another without others in the room being aware of the transaction.

Thus, what is required is a solution that allows the wireless transfer of data between personal information devices without imposing any line of sight restrictions or stringent distance requirements. The required solution should be robust and relatively immune to interference in comparison to prior art wireless beaming techniques. In addition, what is required is a solution that permits group beaming of data, wherein data can be shared with several users. The required solution should permit the private sharing of data with several users without nonselected users within communications range being aware of the data transfer. The present invention provides a novel solution to the above requirements.

SUMMARY OF THE INVENTION

The present invention is a method and system for implementing wireless data transfers between a selected group of mobile computing devices. The present invention provides a method and system that allows the wireless transfer of data between personal information devices without imposing any line of sight restrictions. The present invention provides a solution that allows data transfer between personal information devices without imposing stringent distance requirements. The solution of the present invention is robust and relatively immune to interference in comparison to prior art wireless beaming techniques. In addition, the present invention provides a method and system that permits group beaming of data, wherein data can be shared with several users. The present invention permits the private sharing of data with several users without nonselected users within communications range being aware of the data transfer.

In one embodiment, the present invention is implemented as an RF wireless communication method for selective transmission of data among a group of mobile computing devices, such as, for example, personal information devices (PIDs). A user's device is used to broadcast a query to determine a group of mobile computing devices within communications range. A list of resulting mobile computing devices is then presented to the user through the device's interface. The user selects at least one of the mobile computing devices from the list for a data transfer. The data transfer is then performed to the selected at least one mobile computing device. Upon completion of the transfer, a confirmation is presented to the user. In this manner, wireless data transfers can be performed with a number of different mobile computing devices within communications range. The user can select a number of mobile computing devices from the list and perform the data transfer to each of the selected number in a single step. The data transfer is performed using a wireless RF communications link. The wireless RF communications link can be compatible with a version of the Bluetooth specification.

In an alternate embodiment, the present invention is implemented as a communications method which can selectively use either RF based wireless communications or IR based wireless communications to implement data transfers. The selection of which communications mode is to be used is made by the user via an interface of the mobile computing device. When the multi-user beaming is required, the user can select RF based data transfer. When point-to-point beaming is required, the user can select IR based data transfer.

BRIEF DESCRIPTION OF THE DRAWINGS

The present invention is illustrated by way of example and not by way of limitation in the figures of the accompanying drawings, in which like reference numerals refer to similar elements, and in which.

DETAILED DESCRIPTION OF THE INVENTION

In the following detailed description of the present invention, a method and system for implementing wireless data transfers between a selected group of mobile computing devices, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

Some portions of the detailed descriptions which follow are presented in terms of procedures, logic blocks, processing, and other symbolic representations of operations on data bits within a computer memory. These descriptions and representations are the means used by those skilled in the data processing arts to convey most effectively the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "emulating" or "implementing," "transferring," "executing," "arbitrating," "configuring," "bursting," "initializing," or the like, refer to the actions and processes of an embedded computer system, or similar embedded electronic computing device, that manipulates and transforms data represented as physical (electronic) quantities within the computer system's registers and memories into other data similarly represented as physical quantities within the computer system memories or registers or other such information storage, transmission or display devices.

The present invention is directed towards a method and system that allows the wireless transfer of data between personal information devices without imposing any line of sight restrictions. The present invention provides a solution that allows data transfer between personal information devices without imposing stringent distance requirements. The solution of the present invention is robust and relatively immune to interference in comparison to prior art wireless beaming techniques. In addition, the present invention provides a method and system that permits group beaming of data, wherein data can be shared with several users. The present invention permits the private sharing of data with several users without nonselected users within communications range being aware of the data transfer. Embodiments of the present invention and its benefits are further described below.

It should be noted that the method and system of the present invention can be configured to enable wireless communication between a number of types of mobile computing devices. Such mobile computing devices included, for example, personal information devices (PIDs), hand-held cellular telephones (cell phones) and other types of mobile telephones, alphanumeric paging devices, and the like.

Figure 1:
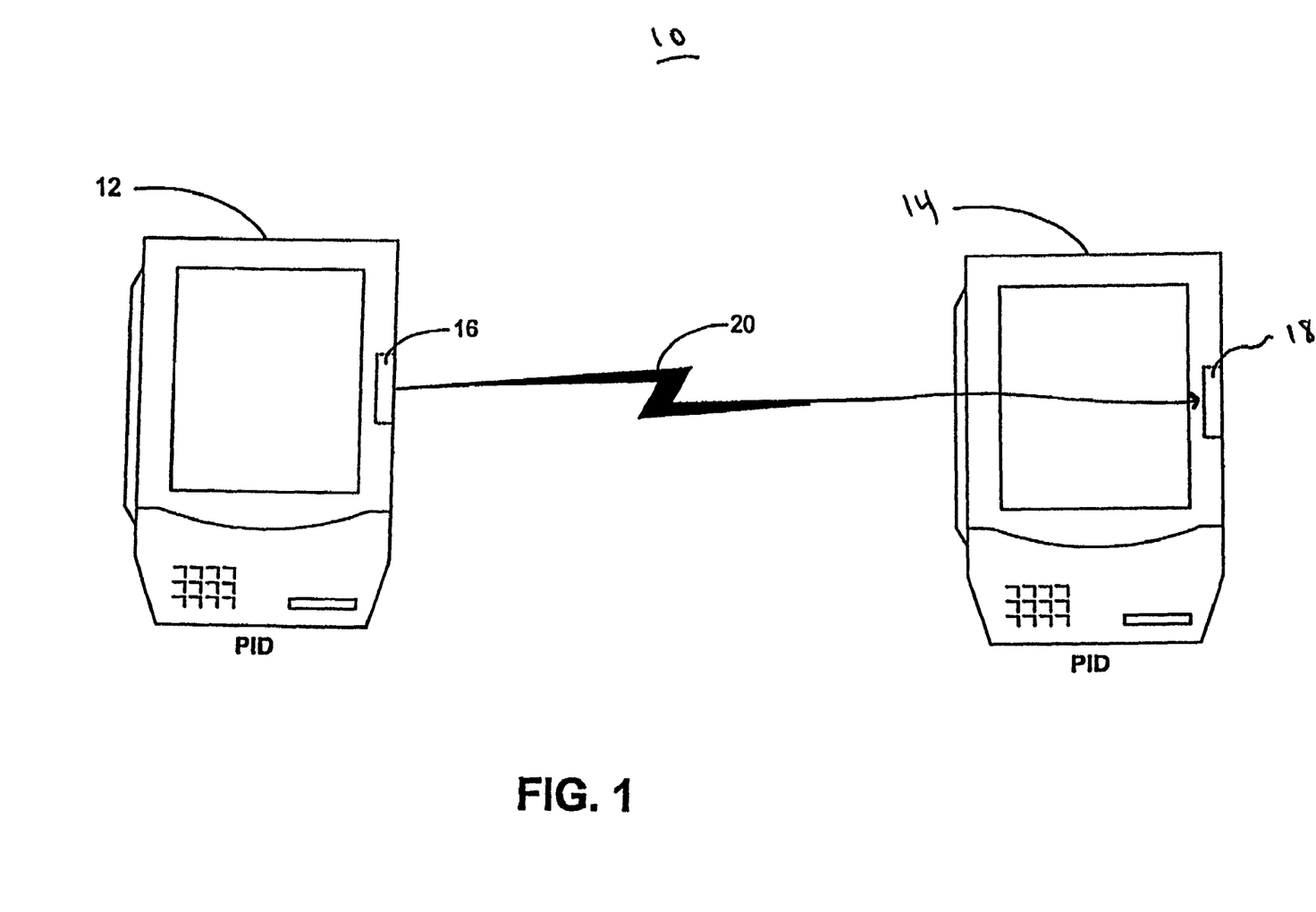
FIG. 1 is a diagram illustrating an exemplary preferred embodiment of the present system.

FIG. 1 shows and exemplary embodiment of a system 10 in accordance with one embodiment of present invention. The system 10 includes a hand-held PID 12 and a PID 14. As describes above, the preferred embodiment utilizes a PID 12 communicatively coupled to a second PID 14. However, many electric devices, such as digital cameras, limited feature pagers, laptop computers, and the like, are similar to many PIDs in that they can exchange and make use of the scheduling information contained within a user PID. Limited-feature devices may also be enhanced by coupling the devices with a PID in accordance with present invention to exchange and view data stored on the PID.

As shown in FIG. 1, the PID 12 of the present system 10 includes a wireless port, or transceiver, 16 (used herein to mean some combination of a receiver and/or transmitter). The PID 14 has a corresponding wireless port, or transceiver, 18 such that a wireless link 20 is established between the PID of 14 and PID 12.

In one preferred embodiment, the wireless ports 16, 18 each include a short-range radio frequency (RF) transceiver. The wireless transceivers 16-18 establish an RF link, such as that defined by the Bluetooth communications specification.

Additionally, the link 20 can also include support for other modes of communication, including an infrared communication links such as that as defined by the Infrared Data Association (IrDA).

Figure 2:
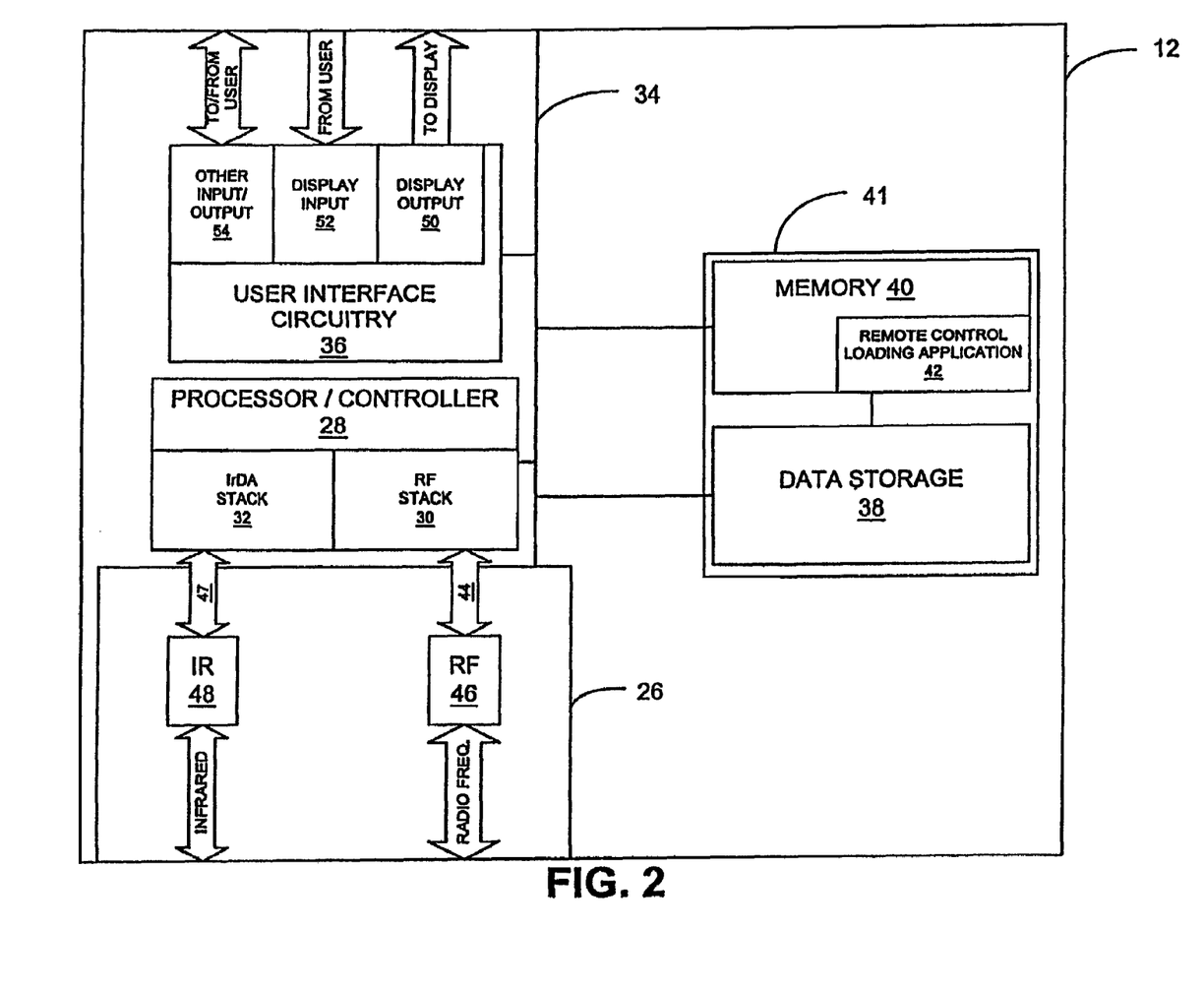
FIG. 2 is a block diagram illustrating the layers of a radio frequency protocol stack used in the PID of FIG. 2.

FIG. 2 is a function block diagram showing an exemplary embodiment of the PID 12 that can communicate with the PID 14 or other such devices. The link interface circuitry 26 illustrates, but is not limited to, two alternative link interfaces for establishing a wireless link to another device. One wireless link interface (or more than two link interfaces) may, of course, be used with the present system 10.

The PID 12 includes a processor, or controller, 28 that is capable of executing an RF stack 30 and an IrDA stack 32. The stack 30, 32 communicate with data interface circuitry 26 through a bus 34. The processor 28 is also connected through the bus 34 to user interface circuitry 36, a data storage module 38 and memory 40. As used herein, the data storage module 38 and memory 40 may both generally be referred to as part of the PID memory 41.

The memory 40 may contain a specific remote control loading application 42. The remote control loading application 42 may operate, for example, after the processor 28 receives a message for the user to establish a wireless link with the PID 14 in the nearby environment. Alternatively, the remote control loading application 42 may operate in a PID default mode.

The data interface circuitry 26 includes, in this exemplary embodiment, a first and second port, such as, infrared and RF interface ports. The first wireless link interface, the RF link interface, may include first connection 44 which includes radio-frequency (RF) circuitry 46 for converting signals into radio-frequency output and for accepting radio-frequency input. The RF circuitry 46 can send and receive RF data communications via a transceiver that are part of the communication port 16. The RF communication signals received by the RF circuitry 46 are converted to electrical signals and relayed to the RF stack 30 in processor 28 via the bus 34.

The PID 14 includes a corresponding port, or transceiver, 18 for RF signals. Thus, the RF 24 and wireless link 20 between the PID 12 and PID 14 may be implemented according to the Bluetooth specification, described at www.bluetooth.com, which is incorporated in its entirety into this document.

Bluetooth is a short-range radio link intended to replace the cable(s) connecting portable and/or fixed electronic devices. Bluetooth technology features low power, robustness, low complexity and low cost. It operates in the 2.4 Ghz unlicensed ISM (Industrial, Scientific and Medical) band. Devices equipped with Bluetooth are capable of exchanging data at speeds up to 720 kbps at ranges up to 10 meters. It should be noted that higher power devices other than the typical Bluetooth enabled PID, such as, for example, a network access point, may communicate via Bluetooth with an RF-enabled PID over a greater range, such as, for example, approximately 100 meters.

A frequency hop transceiver is used to combat interface and fading. A shaped, binary FM modulation is applied to minimize transceiver complexity. A slotted channel is applied with a nominal slot length of 625 μs. For full duplex transmission, a Time Division Duplex scheme is used. On the channel, information is exchanged through packets. Each packet is transmitted in a different hop frequency. A packet nominally covers a single slot, but can be extended to cover up to five slots.

The Bluetooth protocol uses a combination of circuit and packet switching. Slots can be reserved for synchronous packets. Bluetooth can support an asynchronous data channel, up to three simultaneous voice channels, or a channel that simultaneously supports asynchronous data and synchronous voice. Each voice channel supports a 64 kb/s synchronous (voice) channel in each direction. The asynchronous channel can support maximum 723.2 kb/s asynchronous, or 433.9 kb/s symmetric.

The Bluetooth system consists of a radio unit, a link control unit, and a support unit for link management and host terminal interface functions. The link controller carries out the baseboard protocol and other low-level routines.

The Bluetooth system also provides a point-to-point connection (only two Bluetooth units involved) or a point-to-multipoint connection. In the point-to-multipoint connection, the channel is shared among several Bluetooth units. Two or more units sharing the same channel form a piconet. One Bluetooth unit acts as the master of the piconet, whereas the other units act as slaves. Up to seven slaves can be active in a piconet.

The Bluetooth link controller has two major states: STANDBY and CONNECTION. In addition, there are seven substates: page, page scan, inquiry, inquiry scan, master response, slave response, and inquiry response. The substates are interim states that are used to add new slaves to the piconet.

The STANDBY state is the default state into the Bluetooth unit. In this state, the Bluetooth unit is in a low-power mode. The controller may leave the STANDBY state to scan for page or inquiry messages, or to page or inquiry itself When responding to a page message, the unit enters the CONNECTION state as a master.

In order to establish new connections, the inquiry procedures and paging are used. The inquiry procedures enable a unit to discover which units are in range, and what their device address and clocks are during an inquiry substate. The discovering unit collects the Bluetooth device addresses and clocks of all units that respond to the inquiry message. It can then, if desired, make a connection to any one of them. The inquiry message broadcasted by the source does not contain any information about the source. However, it may indicate which class of devices should respond.

There is one general inquiry access code (GIAC) to inquire for any Bluetooth device, and a number of dedicated inquiry access codes (DIAC) that only inquire for a certain type of devices. A unit that wants to discover other Bluetooth units enters an inquiry substate. In this substate, it continuously transmits the inquiry message (which is an identification packet) at different hop frequencies. A unit that allows itself to be discovered, regularly enters the inquiry scan substate to respond to inquiry messages.

As noted above, the system 10 may operate with only one wireless link. However, additional, or alternative, wireless link interfaces may also be included in the system 10. A second connection 46 includes infrared circuitry 48 for converting signals into infrared output and for accepting infrared input. Thus, the wireless link 28 may include an infrared interface. The infrared circuitry 48 can send and receive infrared data communications via the port, or transceiver, 16.

Infrared communication signals received by infrared circuitry 48 are converted into electrical signals that are relayed to the IrDA stack 32 in the processor, or controller, 28 via the bus 34. The PID 14 may include a corresponding infrared transceiver. The infrared circuitry 48 operates according to the IrDA specifications available at www.IrDA.org.

The two, alternative link interfaces described above are merely exemplary, and additional means for implementing the interface between a PID and telephone or other such device may also be utilized. Although not required, more than one wireless link interface may be included to improve flexibility and to provide redundancy in case of failure of one of the link interfaces.

User interface circuitry 36 in the PID 12 includes hardware and software components that provide user input and output resources for functions in the processor 28. The user interface circuitry 36 includes display output 50, display input 52, and additional input/output interface circuitry 54.

The display output 50 preferably receives digital information representing graphical data from the processor 28 and converts the information to a graphical display, such as text and or/images, for display on a display screen. The display input 52 may receive data inputs, such as graphical data inputs, from a user of the PID 12. The graphical data inputs are preferably entered by the user with a stylus on a pressure sensitive display screen, and may include text, drawings, or other objects that are capable of being graphically presented.

Typically, the additional input/output interface 54 permits user input and commands to be input through buttons and similar devices on the PID, e.g., buttons for scrolling through data entries and activating applications. Alternatively, the input/output interface 54 may allow the PID 12 to accept audio data as well as other types of non-graphical data. For example, audio data signals (or picture telephone video input) may be entered through the additional input/output interface 54.

Figure 3:
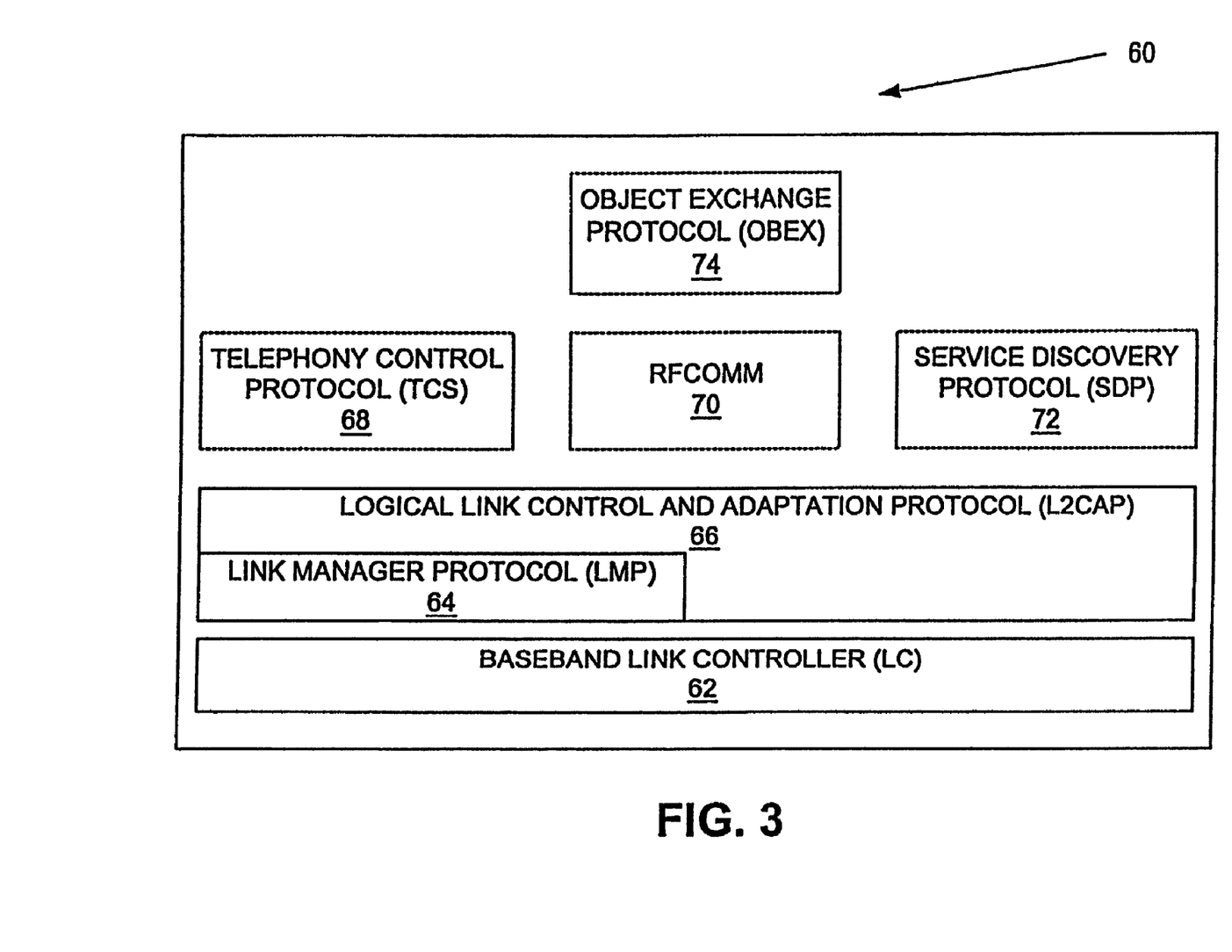
FIG. 3 shows a stack layer diagram illustrating the layers of an RF protocol stack in accordance with one embodiment of the present invention.

FIG. 3 shows a diagram illustrating the layers of the Bluetooth (RF) protocol stack 60 in accordance with one embodiment of the present invention. An RF protocol stack is implemented at each end of the connection endpoints of an RF link. For example, a PID 12 and a telephone 14 could each implement an RF stack to enable a link. The required layers of the RF link using the Bluetooth system are the Baseband layer 62, the Link Manager Protocol Layer (LMP) 64, the Logical Link Control and Adaptation Layer 68, RFCOMM Layer 70, Service Discovery Protocol Layer 72, and Object Exchange Protocol (OBEX) layer 74.

Figure 4:
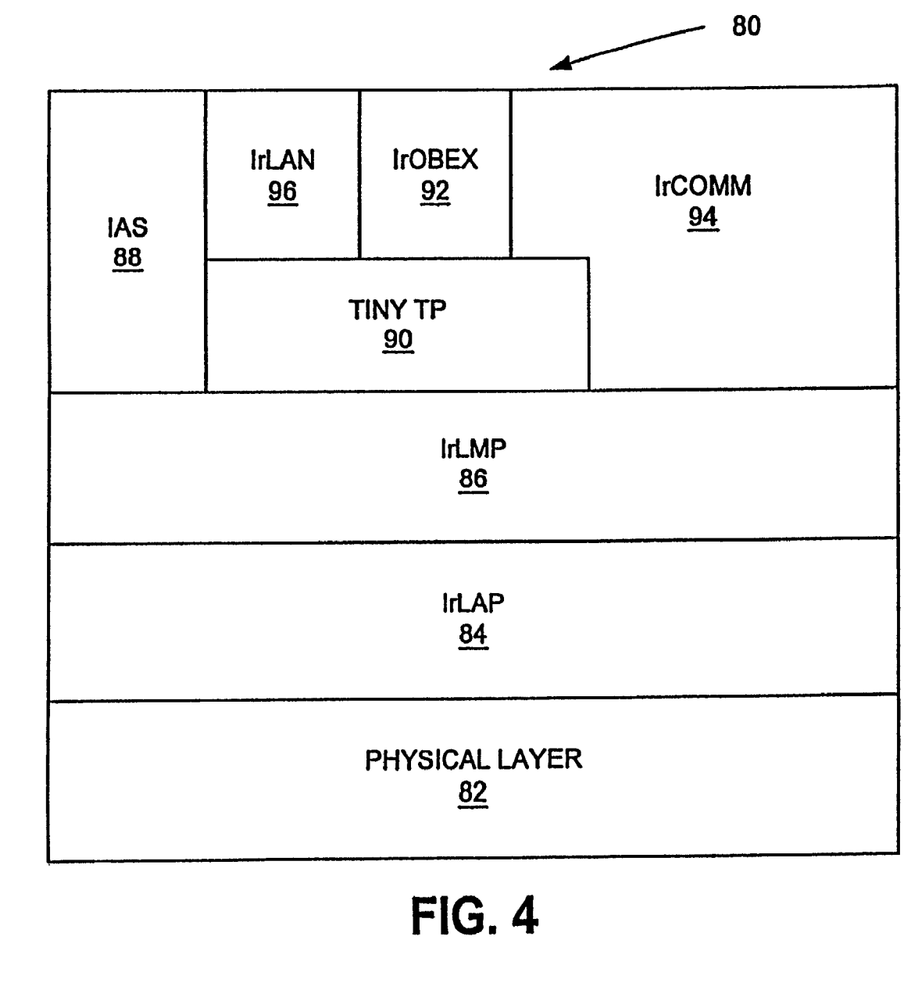
FIG. 4 if a stack layer diagram illustrating layers of an Infrared Data Association protocol stack used in the PID of FIG. 2.

FIG. 4 is a protocol diagram 80, illustrating the layers of the IrDA protocol stack that may be used with the system 10. For example, the PID and the telephone 41 each implement an IrDA protocol stack to enable the wireless link 20.

The required layers of an IrDA protocol stack are the physical layer 82, the IrLMP layer 84, the IrLMP layer 86 and the IAS layer 88. The physical layer 82 specifies optical characteristics of the link, encoding of the data, and framing for various speeds. The IrLAP (Link Access Protocol) layer 84 establishes the basic reliable connection between the two ends of the link. The IrLMP (Link Management Protocol) layer 86 multiplexes services and applications on the IrLAP connection. The IAS (Information Access Service) layer 88 provides a directory of services on an IrDA device.

The IrDA protocol also specifies a number of optional protocol layers, these protocol layers being TINY TP 90, IrOBEX 92, IrCOMM 94 and IrLAN 96. TINY TP (Tiny Transport Protocol) 90 adds per-channel flow control to keep traffic over the link 20 moving smoothly. IrOBEX (Infrared Object Exchange Protocol) 92 provides for the easy transfer of files and other data objected between the IrDA devices at each end of the applications that use serial and parallel communications using IrDA without change. IrLAN (Infrared Object Exchange Protocol) 92 provides for the easy transfer of files and other data objects between the IrDA devices at each end of the link 20. IRCOMM 94 is a serial and parallel communications using IrDA without change. IrLAN (Infrared Local Area Networks) 96 enables walk-up infrared LAN access.

The use of the optional layers depends upon the particular application in the IrDA device. The IrDA protocol stack is defines by such standard documents as "IrDA Serial Infrared Physical Layer Link Specification", "IrDA 'IrCOMM': Serial and Parallel Port Emulation over IR (wire replacement)", "IrDA Serial Infrared Link Access Protocol (IrLAP)", "IrDA Infrared Link Management Protocol(IrLMP)", and "IrDA 'TINY TP': A Flow-Control Mechanism for use with IrLMP,: and related specification published by the IrDA. Such documents are available at www.irda.org/standards/specifications.asp and are incorporated in their entirety in this document.

Figure 5:
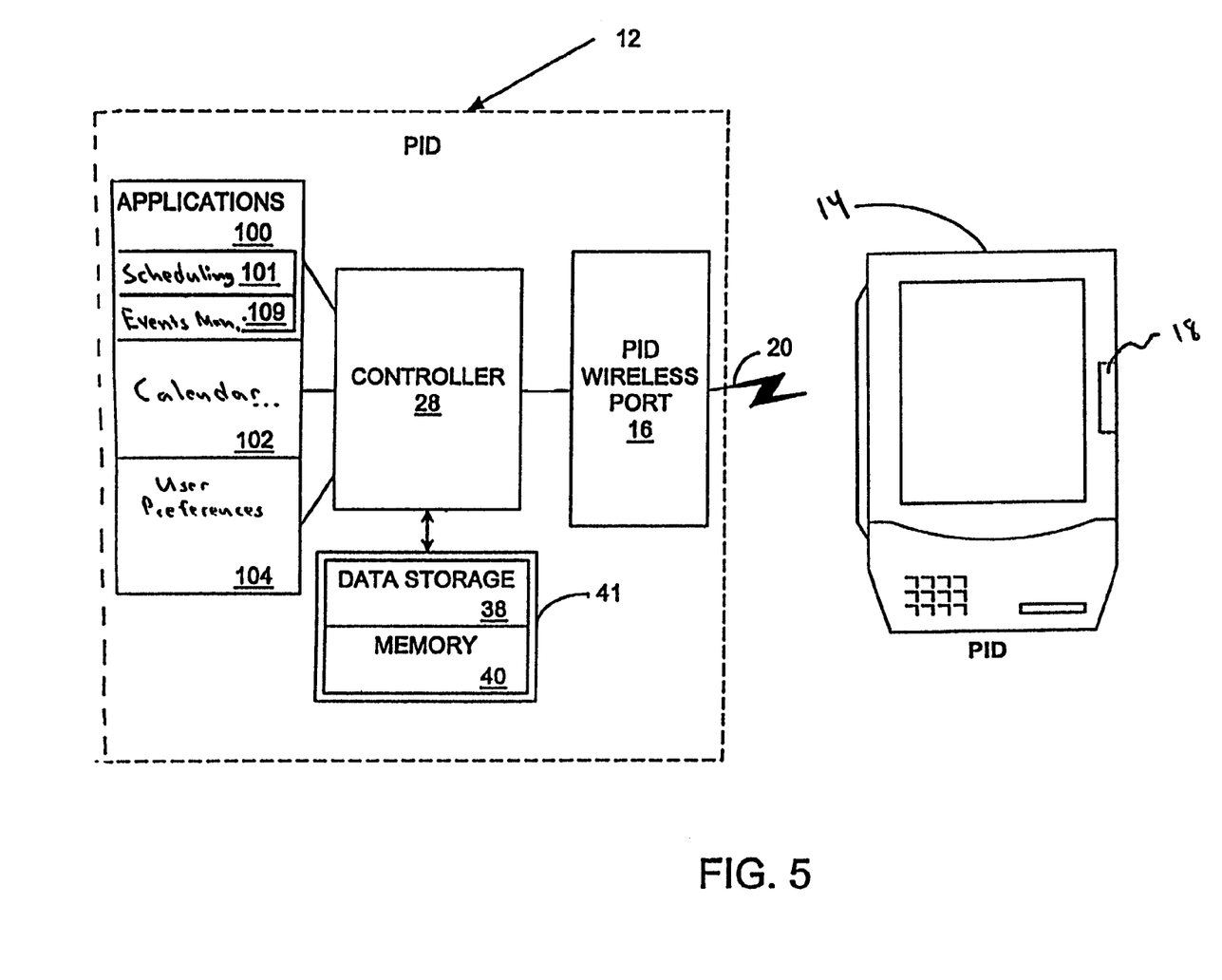
FIG. 5 is a block diagram of the system of FIG. 1.

As shown in FIG. 5, the PID 12 may include resident applications 100, such as, for example, a scheduling program 101 for managing schedule information. The PID 12 may include as well, for example, events management program 109 for recording the start time and stop time of special events, a calendar program 102 for assisting in managing scheduling and events, and a user preferences program 104 for configuring PID 12 in accordance with the requirements of the user.

As described above, the present invention is method and system for implementing wireless data transfers between a selected group of PIDs, or similar types of mobile computing devices. In one embodiment, PID 12 can be configured for either RF based wireless communication or IR based wireless communication. When RF based communication is selected by the user, the PID 12 of present invention implements data transfers without imposing stringent line of sight or distance restrictions. An RF based communications link 20 is robust and relatively immune to interference in comparison to IR based wireless beaming techniques. In addition, the present invention provides a method and system that permits group beaming of data, wherein data can be shared with several users. The present invention permits the private sharing of data with several users without nonselected users within communications range being aware of the data transfer.

The use of IR based communication includes a number of limitations. For example, PID 12 and PID 14 must generally be within line of sight of each other. Also, PID 12-14 must usually be no more than 24 to 36 inches apart. Bright sunlight can interfere with IR beaming. With respect to group beaming, IR based communication is generally limited to one-on-one communication, as opposed to data being beamed to several users at once. Because of these limitations, the IR beaming of data is somewhat conspicuous with respect to other users being aware of the communication. One cannot IR beam data to another without others in the room noticing the data transaction. The present embodiment solves this problem by allowing the user to select RF based communication to overcome these limitations.

Figure 6A:
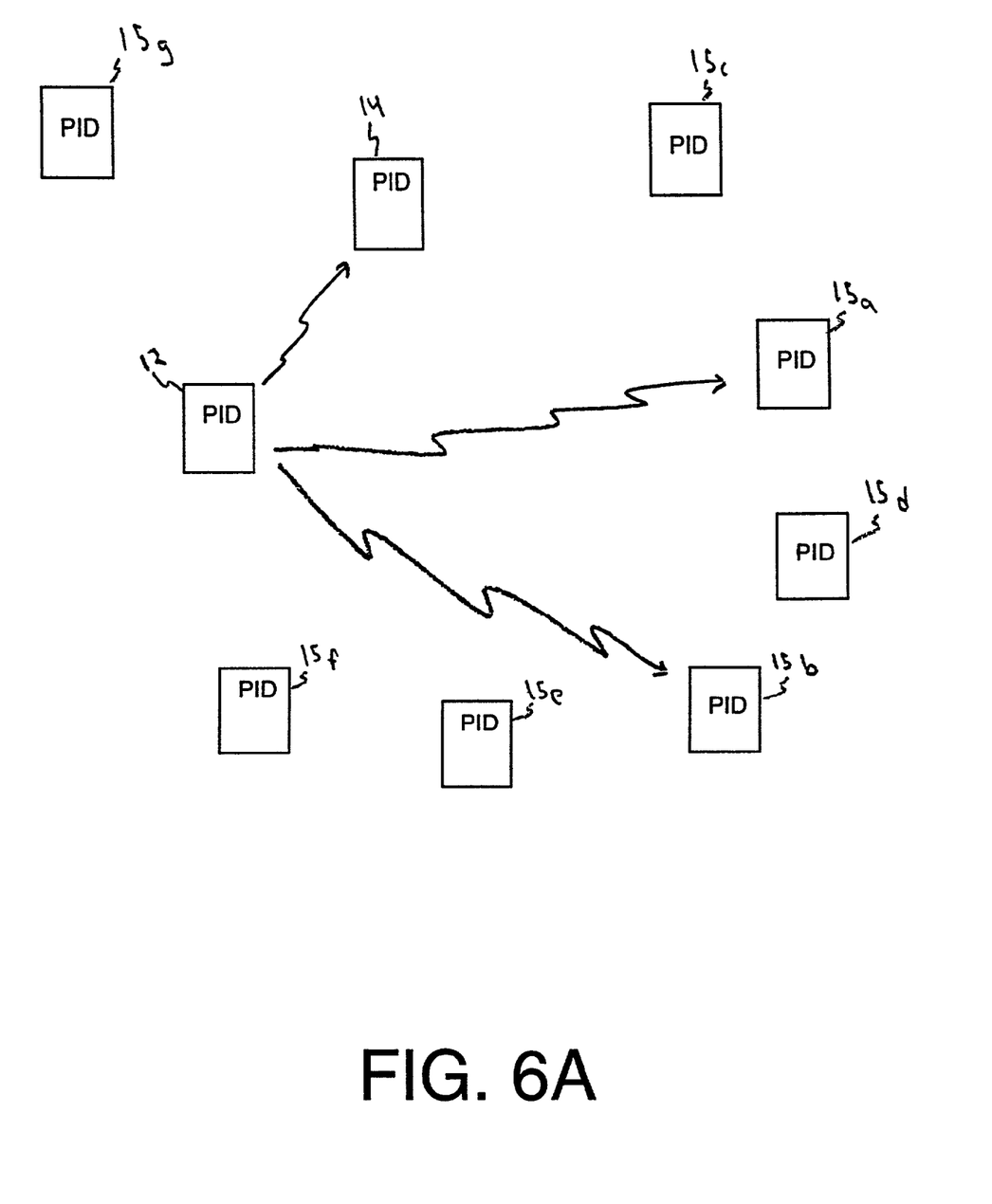
FIG. 6A shows a diagram of a multiple recipient data transfer operation in accordance with one embodiment of the present invention.

Referring now to FIG. 6A, a diagram of the group communication in accordance with one embodiment of the present invention is shown. As depicted in FIG. 6A, PID 12 establishes communication with PID 14 in the manner described in the discussion FIG. 1. In addition, PID 12 also establishes communication with PIDs 15*a-b*. PID 12 uses RF based communication to beam data to PID 14 and PIDs 15*a-b* without beaming data to PID 15*c-g*. The use of RF based beaming overcomes limitations of IR based beaming. Data is beamed from PID 12 to PID 14 and PIDs 15*a-b* without the users of PID 15*c-g* being aware of the exchange.

To implement the group beaming, PID 12 broadcasts a query for potential recipients within communications range. PID 12 sends out a query using RF broadcast, polling for the other RF communication enabled (e.g., Bluetooth-enabled) mobile computing devices within a certain communications range (e.g., 10-meter range for Bluetooth). The RF communication can be enabled from a number of different applications executing on PID 12. Such applications include, for example, Address Book, Date Book, To Do List, Memo Pad, and Launcher, and the like. The user would initiate beaming (without regard to whether the beaming is to be Infrared or Radio-based) using familiar user interface menus and/or dialog boxes of PID 12. In the present embodiment, the user interface will include selectable "buttons" (e.g., within a dialog box or a menu) to allow the user to designate whether the beaming is to be IR based or RF based.

Figure 6B:
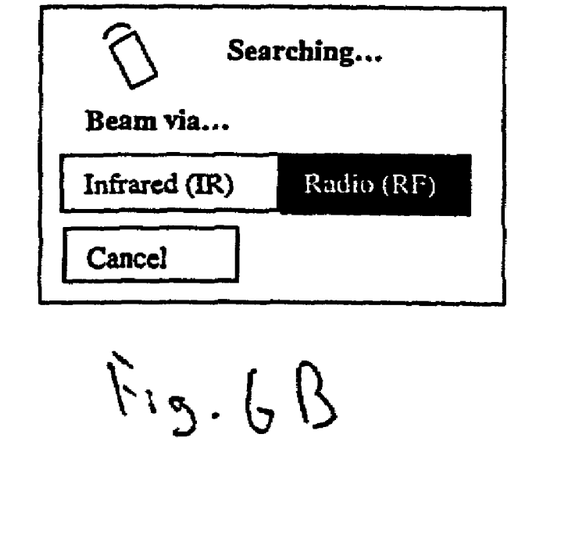
FIG. 6B shows a first GUI dialog box in accordance with one embodiment of the present invention.
Figure 6C:
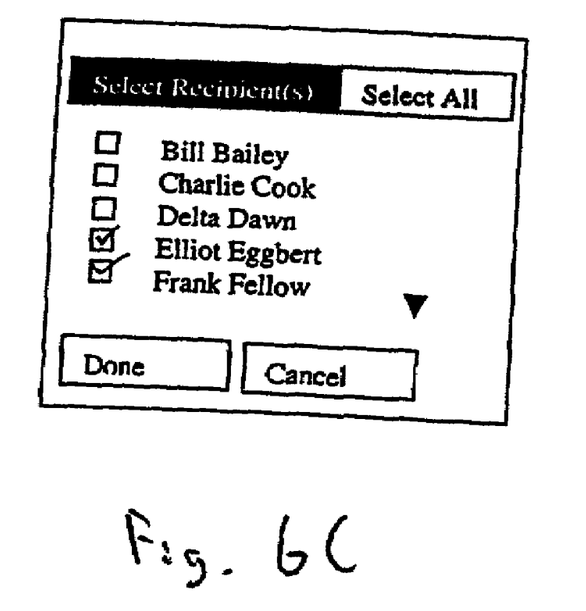
FIG. 6C shows a second GUI dialog box in accordance with one embodiment of the present invention.

FIG. 6B and FIG. 6C show a first and second dialog box in accordance with one embodiment of the present invention. The dialog boxes of FIG. 6B and 6B are depicted as they may appear on a display of PID 12. Referring to FIG. 6B, in the present embodiment, for example, when the user issues the "Beam" command from an Address List View, a dialog box will pop up prompting the user to select either IR or RF based beaming, or offering the user a chance to cancel the beaming operation.

It should be noted that the dialog box can be configured to "remember" the last setting used (IR or RF). Users can change it by tapping in the appropriate area. If, for example, the user wants to beam by the same method as the last beaming accomplished on PID 12, no additional stylus taps are required to repeat the beaming in the same manner. If the user wants to change from IR to RF-beaming, or vice versa, it requires only one stylus tap to make this change.

Referring now to FIG. 6C, if the "Beam via" choice is Radio (RF), PID 12 polls for all available Bluetooth-enabled devices to beam to, and presents the user with a list. The user can tap on Select All to send to everybody (e.g., all PIDs within communications range), or tap to select individual names (Tap again to deselect). If there are more names than will fit on one screen, a down-arrow can be configured to appear. Once the one or more individuals are selected, the user can select Done to initiate the beaming, or select cancel.

Using this method, the user can simply and easily beam data from one handheld organizer (e.g., PID 12) to one or several handheld organizers within 10 meters, without having to be in line-of-sight, and without others in the room necessarily realizing that this beaming operation had occurred. The beaming operation can either be to a single recipient, or to a selected group via "broadcast and selective send" beaming to other Bluetooth-enabled devices such as laptops, telephones, network access points, cordless modems, and so on., or even to all devices within range.

It should also be noted that although the present invention is described at times within the context of the Bluetooth Specification and that the underlying technology used to send data objects between devices is described in the context of the Bluetooth Specification, the present invention can be configured to function with other types of RF based communication technologies.

Figure 7:
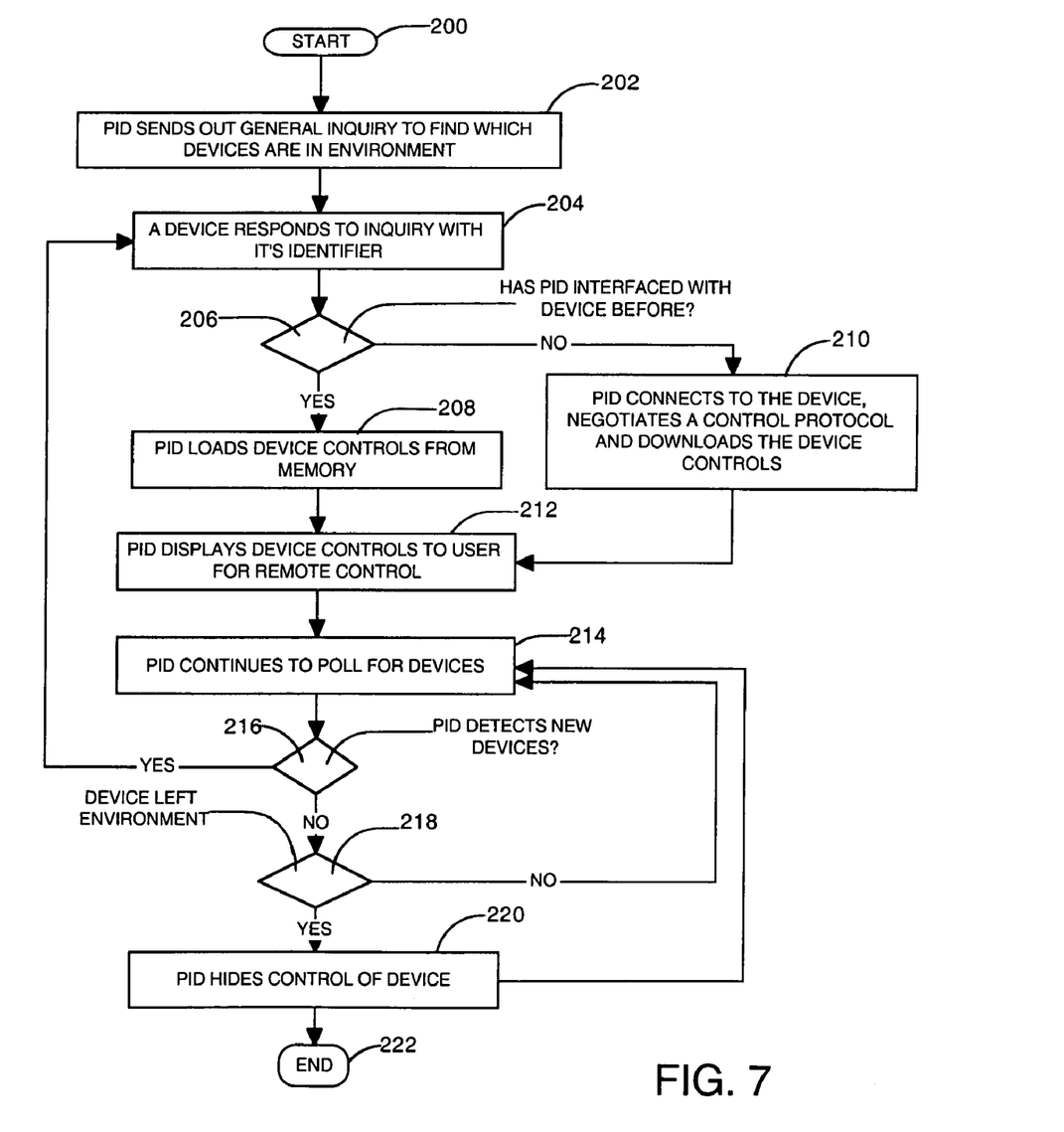
FIG. 7 is a flowchart illustrating on exemplary method for multiple PIDs to establish a wireless link.

FIG. 7 illustrates a process by which the PID 12 detects and communicates with another device, such as the PID 14 that is in its environment (or other additional PIDs within range). The process begins at Step 200 when either the user manually initiates the process or the process is implemented as a default. At step 202, the PID 12 sends out a general query to determine whether a corresponding device is present in the nearby environment (for example, in the room). According to Bluetooth terminology, this step is analogous to the process of discovery.

At Step 204, the PID 14 responds to the query with its unique identifier using, but not limited to, the discovery protocol defined by the Bluetooth specification. The PID 12 then loads the controls of each device using at least two methods. If it is determined at Step 206 that the PID 12 has interfaced with the PID 14 before and the controls had previously been downloaded, then, at Step 208, the PID 12 accesses the controls from its memory. However, if it is determined at Step 206 that the PID 12 has not interfaced with the PID 14 before, then, at Step 210, the PID 12 connects with the PID 14 and negotiates a control protocol. As an alternative, the PID 12 may be manufactured with pre-stored controls for certain devices. These controls may be accessed whenever the PID 12 detects the respective devices or class of devices.

At Step 212, the PID 12 presents a notification to the user, indicating that the link between the PID 12 and PID 14 has been established. The PID 12 then continues to poll for devices at regular time interval, as set out in Step 214, querying the environment to determine if any devices, like the PID 14, have appeared or any such devices have left the PID environment. If the PID 12 detects a new device in its environment at Step 218, the PID 12 hides the control for the PID 14 from the user and transfers the controls to a storage location, such as the memory 40 or data storage module 38 (Step 220).

If the PID 14 is still in the PID's environment, as determined at step 218, then the process returns to Step 214 and continues. The process ends at Step 222 if the user disables the remote control loading applications. However, if the user does not disable the application, then the process returns to Step 214 and follows the process again.

Figure 8:
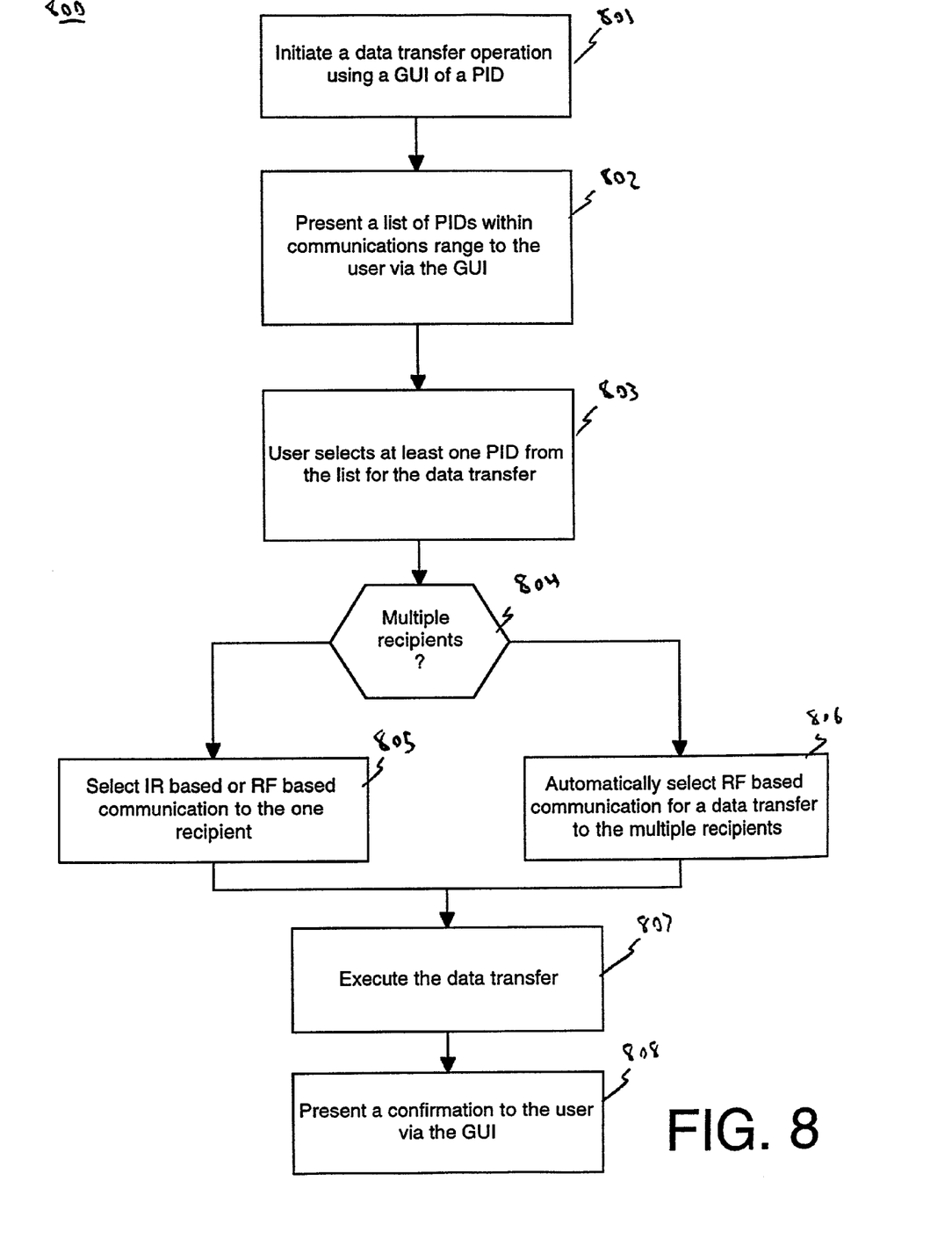
FIG. 8 is a flowchart illustrating an exemplary method for the system of FIG. 6A to execute data transfers to a single recipient or multiple recipients in accordance with one embodiment of the present invention.

Referring now to FIG. 8, a flow chart of the steps of an RF wireless communication process 800 for selective transmission of data among a group of mobile computing devices in accordance with one embodiment of the present invention is shown. FIG. 8 depicts the operating steps performed after the wireless communications link is established with mobile computing devices within commutations range as in the steps shown in FIG. 7. In this embodiment, the mobile computing devices are PIDs (personal information devices).

Process 800 begins in step 801, where a user initiates a data transfer operation using a GUI of a PID (e.g., PID 12). As described above, the data transfer can involve a number of information exchange application programs running on PID 12. For example, the user can pass information regarding a scheduled meeting, contact information regarding an electronic business card, or the like. In step 802, a list of PIDs within communications range are presented to the user through the device's interface (e.g., as shown in FIG. 6C). As described above, the user's PID can be configured to present a dialog box to allow the selection of particular recipients for the data transfer. In step 803, the user selects at least one of the mobile computing devices from the list for a data transfer.

Referring still to FIG. 8, in steps 804 and 805, where the user selects one recipient, the user is presented with a GUI prompting the selection of whether IR based or RF based communication is to be used for the beaming operation (e.g., as shown in FIG. 6B). In steps 804 and 806, where the user selects multiple recipients, the PID 12 automatically selects RF based communication for the beaming operation to ensure the data is sent to the multiple recipients. In step 807, the data transfer is executed in accordance with the selection of the user in steps 804-805. In step 808, the PID 12 presents a confirmation dialog box informing the user whether the data transfer was completed successfully.

Referring still to FIG. 8, in this manner, wireless data transfers can be performed with a number of different mobile computing devices within communications range. The user can select a number of mobile computing devices from the list and perform the data transfer to each of the selected number in a single step. The data transfer is performed using a wireless RF communications link. The wireless RF communications link can be compatible with a version of the Bluetooth specification.

In an alternate embodiment, the determination as to whether the data transfer is to be implemented as a RF based wireless communication or IR based wireless communication can be made after the recipients are selected as shown in FIG. 6C. Hence, when multiple users are selected and multi-user beaming is required, the user can select RF based data transfer. When a single user is selected and point-to-point beaming is desired, the user can select IR based data transfer.

Thus, the present invention is method and system for implementing wireless data transfers between a selected group of mobile computing devices. The present invention provides a method and system that allows the wireless transfer of data between personal information devices without imposing any line of sight restrictions. The present invention provides a solution that allows data transfer between personal information devices without imposing stringent distance requirements. The solution of the present invention is robust and relatively immune to interference in comparison to prior art wireless beaming techniques. In addition, the present invention provides a method and system that permits group beaming of data, wherein data can be shared with several users. The present invention permits the private sharing of data with several users without nonselected users within communications range being aware of the data transfer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A wireless communication method for selective transmission of data among a group of mobile computing devices, comprising:
   broadcasting, from a particular mobile computing device, an inquiry message to determine a group of mobile computing devices within direct wireless communications range of the particular mobile computing device;
   presenting, on a graphical user interface of the particular mobile computing device, a list of one or more mobile computing devices within direct communications range that respond to the inquiry message;
   receiving a selection of at least one of the mobile computing devices from the list for receiving a transfer of data stored on the particular mobile computing device, the selecting performed at the graphical user interface by a user;
   prompting, using the graphical user interface and only in response to a received selection comprising a single mobile computing device, the user to select a wireless communication type selected from the group consisting of an infrared link and a radio frequency (RF) link, otherwise automatically selecting the radio frequency link; and
   performing the transfer of data stored on the particular mobile computing device to the at least one mobile computing devices using the wireless communication type selected at the particular mobile computing device.

2. The method of claim 1 wherein at least one of the mobile computing devices is a PID (personal information device).

3. The method of claim 1 wherein at least one of the mobile computing devices is a cellular telephone.

4. The method of claim 1 wherein the inquiry message is broadcast using the RF link.

5. The method of claim 1 wherein the RF link is compatible with a version of the Bluetooth specification.

6. The method of claim 1 further comprising presenting a confirmation of the transfer of the data stored on the particular mobile computing device.

7. The method of claim 1 further comprising storing information indicating the wireless communication type selected when the user selects the wireless communication type.

8. A wireless communication system for selective transmission of data among a group of mobile computing devices, comprising:
   a first mobile computing device operable to broadcast an inquiry message to determine a group of mobile computing devices within direct wireless communications range of the first mobile computing device; and
   a display built into the first mobile computing device and operable to present a GUI (graphical user interface), the GUI operable to present a list of mobile computing devices within direct wireless communications range of the first mobile communications device that respond to the inquiry message and to receive a selection of at least one of the mobile computing devices from the list to receive a transfer of data stored on the first mobile computing device, wherein the GUI prompts a user to select, using the GUI and only in response to a received selection comprising a single mobile computing device, a wireless communication type selected from the group consisting of an infrared link and a radio frequency (RF) link, otherwise automatically selecting the RF link, and wherein the first mobile computing device is further operable to perform the transfer of data to the one or more mobile computing devices using the wireless communication type selected.

9. The system of claim 8 wherein at least one of mobile computing device is a PID (personal information device).

10. The system of claim 8 wherein at least one of the mobile computing devices is a cellular telephone.

11. The system of claim 8 wherein the inquiry message is broadcast using the RF link.

12. The system of claim 8 wherein the RF link is compatible with a version of the Bluetooth specification.

13. The system of claim 8 wherein the first mobile computing device is operable to present a confirmation of the transfer of the data.

14. The system of claim 8 wherein the first mobile computing device is further operable to store information indicating the wireless communication type selected when the user selects the wireless communication type.

* * * * *